US008970582B2

(12) United States Patent
An et al.

(10) Patent No.: US 8,970,582 B2
(45) Date of Patent: Mar. 3, 2015

(54) STEREOSCOPIC IMAGE DISPLAY DEVICE AND METHOD FOR DRIVING THE SAME

(75) Inventors: Cheunghwan An, Seoul (KR); Hyejin Kim, Goyang-si (KR); Hanseok Kim, Paju-si (KR); Myungsoo Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 269 days.

(21) Appl. No.: 13/603,274

(22) Filed: Sep. 4, 2012

(65) Prior Publication Data

US 2013/0057575 A1 Mar. 7, 2013

(30) Foreign Application Priority Data

Sep. 7, 2011 (KR) .................. 10-2011-0090667

(51) Int. Cl.
*G06T 15/00* (2011.01)
*H04N 13/04* (2006.01)
*H04N 13/00* (2006.01)
*G02B 27/22* (2006.01)

(52) U.S. Cl.
CPC ....... *H04N 13/0409* (2013.01); *H04N 13/0452* (2013.01); *H04N 13/047* (2013.01); *G02B 27/2214* (2013.01)
USPC .............................. 345/419; 348/51; 348/42

(58) Field of Classification Search
CPC ...... G02B 27/2214; G02B 27/22; G09G 5/00; G09G 3/36; H04N 13/047; H04N 13/00; G02F 1/133; H09N 13/00; H09N 13/04; G06T 15/20
USPC ........................................... 345/419; 348/51
See application file for complete search history.

(56) References Cited

U.S. PATENT DOCUMENTS

| 6,239,830 B1 * | 5/2001 | Perlin ............................. 348/51 |
| 7,079,174 B2 * | 7/2006 | Taniguchi et al. .............. 348/51 |
| 2003/0086166 A1 * | 5/2003 | Ramanujan ................... 359/464 |
| 2010/0165221 A1 * | 7/2010 | Krijn et al. ...................... 349/15 |
| 2011/0254841 A1 * | 10/2011 | Lim et al. ...................... 345/421 |

FOREIGN PATENT DOCUMENTS

| CN | 101123734 A | 2/2008 |
| JP | 2011-81269 A | 4/2011 |

OTHER PUBLICATIONS

Office Action for Chinese Patent Application No. CN 201210330816.1, Jun. 23, 2014, 11 Pages.

* cited by examiner

*Primary Examiner* — Kee M Tung
*Assistant Examiner* — Zhengxi Liu
(74) *Attorney, Agent, or Firm* — Fenwick & West LLP

(57) ABSTRACT

Stereoscopic image display devices and methods of driving the same. The display device is configurable to display 2D images in a 2D mode and multi-view images in a 3D mode, and includes an optical plate configured to pass through images in the 2D mode, and separate images in the 3D mode; a user detector configured to detect the number of users, and output detection data including the number of the users; a view mode controller configured to calculate the optimum number of views according to the number of the users, and select a view mode based on the number of the optimum views; and a multi-view images converter configured to output image data in the 2D mode without conversion, and convert the image data into multi-view image data for separation according to the number of the views in the selected view mode.

18 Claims, 14 Drawing Sheets

View1

View2

View3

View4

| 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 |
|---|---|---|---|---|---|---|---|---|---|---|---|---|---|---|---|---|---|---|---|---|---|---|
| 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 |
| 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 |
| 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
| 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 |
| 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 |

FIG. 9

| Address | Value |
|---|---|
| H1 | 0 \| 0 \| 0 \| 0 \| 0 \| 0 \| 0 \| 0 \| 0 \| 0 \| 0 \| 0 \| 0 \| 0 \| 0 \| 0 |

| Address | Value |
|---|---|
| H2 | 1 \| 1 \| 1 \| 0 \| 0 \| 1 \| 1 \| 1 \| 1 \| 1 \| 1 \| 0 \| 0 \| 1 \| 1 \| 1 |

| Address | Value |
|---|---|
| H3 | 1 \| 1 \| 1 \| 1 \| 1 \| 1 \| 0 \| 0 \| 0 \| 0 \| 1 \| 1 \| 1 \| 1 \| 1 \| 1 |

# STEREOSCOPIC IMAGE DISPLAY DEVICE AND METHOD FOR DRIVING THE SAME

CROSS-REFERENCE TO RELATED APPLICATION

This application claims priority under 35 U.S.C. §119(a) of Korean Patent Application No. 10-2011-0090667, filed on Sep. 7, 2011, which is incorporated by reference in its entirety.

BACKGROUND

1. Technical Field

The following description relates to a stereoscopic image display device and a method for driving the same using a switchable barrier.

2. Discussion of the Related Art

Techniques for implementing a stereoscopic image display device to display three-dimensional (3D) images are classified as either a stereoscopic technique or an autostereoscopic technique. The stereoscopic technique uses a binocular parallax image between the left and right eyes of a viewer to establish the perception of 3D depth. Techniques for implementing the binocular parallax image include glasses types and non-glasses types of viewing. The glasses type is classified into a patterned retarder type and shutter glass type. The non-glasses type is classified into a barrier type and lens type. In the barrier type, 3D images may be implemented using a barrier plate, such as a parallax barrier or a switchable barrier, for separating the binocular parallax image. In the lens type, the 3D images may be implemented by using a lens plate, such as a lenticular lens or a switchable lens, for separating the binocular parallax image.

A stereoscopic image display device of the barrier type includes the barrier plate which is positioned between a display panel and a user. A 2D luminance of the stereoscopic image display device using the parallax barrier is low because of parallax barrier. However, the 2D luminance of a stereoscopic image display device using the switchable barrier is high because it is possible to control image (or light) separation using the switchable barrier. The switchable barrier separates the binocular parallax image to display 3D images in a 3D mode.

The binocular parallax images displayed by the stereoscopic image display device may include multi-view images. Multi-view images may include a plurality of views. Views of a multi-view image may be produced by separating cameras collecting the multi-view image data from one another. For example, the cameras may be separated by the general distance between the left and right eyes of a viewer when collecting image data, such as of an object. Additionally, when the object is photographed using three or more cameras, the multi-view images may include additional views.

As the number of views increases, an orthoscopic viewing region of 3D images increases. The orthoscopic viewing region describes a situation where a view the left-eye of the user watches is positioned more left than a view the right-eye of the user watches. That is, a given user may optimally watch 3D images in the orthoscopic viewing region. However, as the number of views increases, the perceived resolution of the display panel may decrease because display of a pixel in 3D viewing may include a plurality of sub-pixels corresponding to the number of views.

Accordingly, decreasing the number of views may cause the perceived resolution of the display panel to increase. If the number of views is too few, a pseudo viewing region of 3D images may result. The pseudo viewing region describes a situation where a view the right-eye of the user watches is positioned more left than a view the left-eye of the user watches. That is, a given user may feel uncomfortable when watching 3D images in the pseudo image viewing region.

SUMMARY

One object of the embodiments of this application provides a stereoscopic image display device and a method for driving the same which controls the number of views of multi-view images in accordance with the number of users.

To achieve these objects and other advantages, example embodiments include a stereoscopic image display device that may control the views of multi-view images as necessary to optimize the perceived resolution of the display panel and the 3D image viewing region.

According to one embodiment, a stereoscopic image display device comprises: a display panel configured to display 2D images in a 2D mode and multi-view images in a 3D mode; an optical plate configured to pass through the 2D images, and separate the multi-view images in the 3D mode; a user detector configured to detect the number of users, and output detection data including the number of the users; a view mode controller configured to calculate the number of optimum views according to the number of the users, and select a view mode based on the number of the optimum views; and a multi-view images converter configured to output 2D image data in the 2D mode without conversion, and convert the 2D image data into multi-view image data according to the number of the views in the selected view mode.

In one embodiment, a method of driving the stereoscopic image display device including a display panel and an optical plate configurable in a 2D mode and a 3D mode comprises: detecting the number of users, and outputting detection data including the number of the users; calculating the number of optimum views according to the number of the users, and selecting a view mode in a plurality of 3D modes for configuring the optical plate in the 3D mode based on the number of the optimum views; and outputting image data in the 2D mode without conversion, and converting the image data into multi-view image data according to the number of the views in the selected view mode for configuring the optical plate in the 3D mode.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIG. 9 illustrates an example of 2D driving voltage data, first view driving voltage data, and second view driving voltage data stored in a look-up table shown in FIG. 7, according to one embodiment;

DETAILED DESCRIPTION

Figure 1:
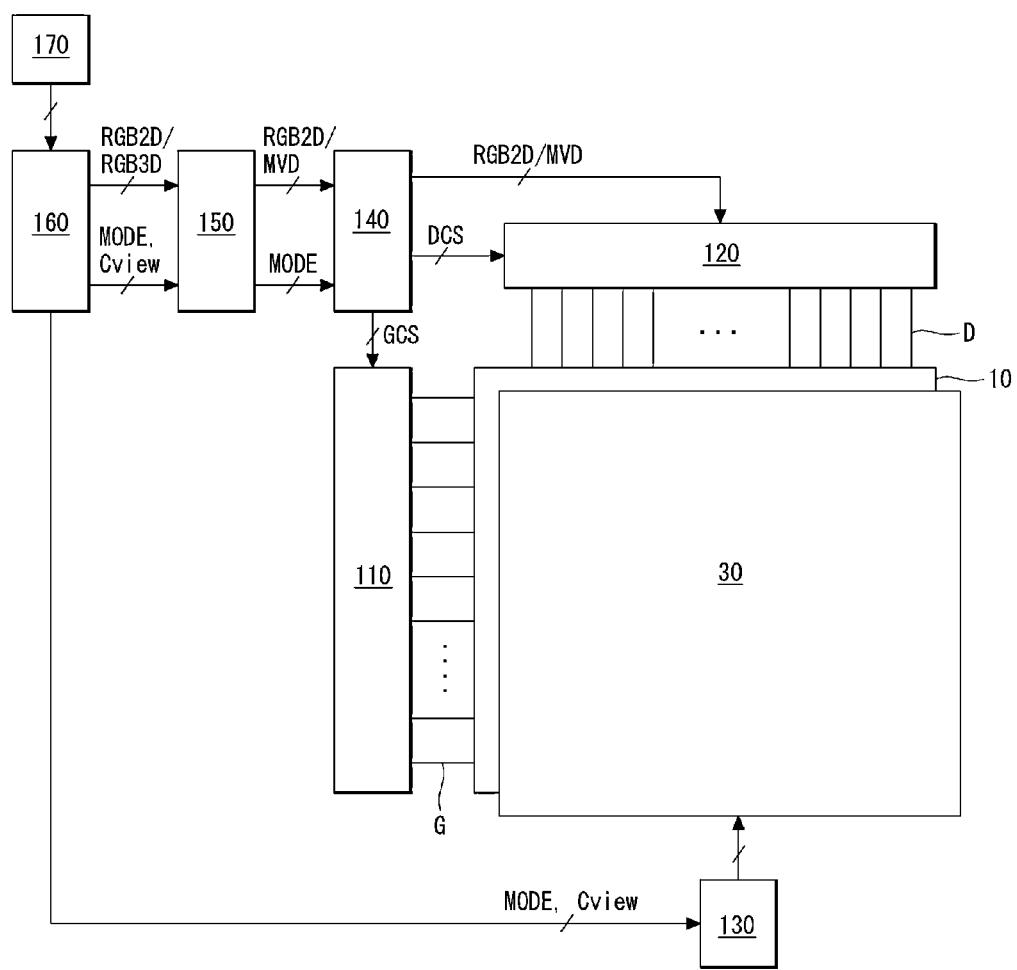
FIG. 1 illustrates a block diagram schematic of a stereoscopic image display device according to one embodiment.

Various embodiments of the inventive aspects are described more fully hereinafter with reference to the accompanying drawings, in which example embodiments are shown. The inventive aspects and embodiments detailed herein may be embodied in many different forms and should not be construed as limited to the embodiments set forth herein. Like reference numerals designate like elements throughout the specification. In the following description, if it is decided that detailed description of known functions or configurations makes the subject matter of the inventive aspects unclear, the detailed description of the known functions or configurations may be omitted for clarity.

FIG. 1 illustrates a block diagram schematic of a stereoscopic image display device according to one embodiment. The stereoscopic image display device according to one embodiment may be implemented as a flat panel display such as a liquid crystal display (LCD), a field emission display (FED), a plasma display panel (PDP) display, and an organic light emitting diode (OLED) display. In the following description, the liquid crystal display (LCD) is described as an example of the stereoscopic image display device. However, embodiments of this application are not limited thereto. For example, other kinds of flat panel displays, such as FED, PDP, and OLED, may be used.

With reference to FIG. 1, the stereoscopic image display device according to one embodiment comprises a display panel 10, an optical plate 30, a gate driver 110, a data driver 120, an optical plate driver 130, a timing controller 140, a multi-view image converter 150, host system 160, and a user detector 170.

The example liquid crystal display panel 10 may include a thin film transistor (TFT) substrate and a color filter substrate (not shown). A liquid crystal layer (not shown) may be formed between the TFT substrate and the color filter substrate. Data lines D and gate lines (or scan lines) G crossing over the data lines D are formed on the TFT substrate. Pixels are arranged in a matrix form in cell areas defined by the data lines D and the gate lines G. A TFT formed at each of the crossings of the data lines D and the gate lines G receives a data voltage supplied via the data line D. In turn, the TFT applies the voltage to a pixel electrode of a corresponding liquid crystal cell in response to a gate pulse supplied through the gate line G. A LC (liquid crystal) common voltage may be supplied to a LC common electrode. Each of the pixels is driven by an electric field between the pixel electrode and the LC common electrode.

A color filter array (not shown), including a black matrix and a color filter, may be formed on the color filter substrate. The LC common electrode may be formed on the color filter substrate in a vertical electric field driving manner, such as a twisted nematic (TN) mode and a vertical alignment (VA) mode. The LC common electrode may be formed on the TFT substrate along with the pixel electrode in a horizontal electric field driving manner, such as in an in-plane switching (IPS) mode and/or a fringe field switching (FFS) mode. The display panel 10 may be implemented in any liquid crystal mode such as the TN, VA, IPS, and FFS modes.

The display panel 10 may be implemented as a transmissive type liquid crystal panel which modulates light from a backlight unit (not shown). The backlight unit may include one or more light sources, a light guide plate (or a diffusion plate), a plurality of optical sheets, and the like. The backlight unit may be implemented as an edge type backlight unit or a direct type backlight unit. The light sources of the backlight unit may include at least one of a hot cathode fluorescent lamp (HCFL), a cold cathode fluorescent lamp (CCFL), an external electrode fluorescent lamp (EEFL), and a light emitting diode (LED).

Additionally, an upper polarizing plate (not shown) may be disposed on the color filter substrate and a lower polarizing plate (not shown) may be disposed on the TFT substrate. Alignment layers (not shown) for setting pre-tilt angles of liquid crystals may be respectively formed on the TFT substrate and the color filter substrate. Additionally, a spacer (not shown) may be formed between the TFT substrate and the color filter substrate to maintain a cell gap of the liquid crystal layer.

The display panel 10 displays 2D images in the 2D mode and multi-view images in the 3D mode under control of the timing controller 140. Thus, the timing controller 140 supplies 2D image data RGB2D to the data driver 120 in the 2D mode and multi-view image data MVD to the data driver 120 in the 3D mode. The multi-view images include a plurality of views. Each view of the multi-view images may be produced by replicating the separation of cameras from one another by the general distance between both eyes of a user viewing an object. When the object is photographed or recorded using three cameras, the multi-view images may include three views. Likewise, if image data is collected of the object using additional cameras, the multi-view images may include additional views.

In one embodiment, the data driver 120 includes a plurality of source driver integrated circuits (ICs) (not shown). The source driver ICs receive image data, RGB2D and MVD, from the timing controller 140. The source driver ICs may convert the 2D image data RGB2D or the multi-view image data MVD into positive or negative polarity voltages. The source driver ICs supply the positive and negative analog data voltages to the data lines D of the display panel 10.

The gate driver 110 sequentially supplies gate pulses synchronized with the data voltage to the gate lines G of the display panel 10 under control of the timing controller 140. In one embodiment, the gate driver 110 includes a plurality of gate driver ICs (not shown). Each of the gate driver ICs may include a shift register, a level shifter for converting an output signal of the shift register into a signal having a swing width suitable for driving liquid crystal cells, an output buffer, and the like.

The timing controller 140 receives the 2D image data RGB2D or the multi-view image data MVD, timing signals, and a mode signal MODE from the multi-view image converter 150. The timing controller 140 generates a gate control signal GCS for controlling the gate driver 110 and a data control signal DCS for controlling the data driver 120, based on the 2D image data RGB2D or the multi-view image data MVD, timing signals, and the mode signal MODE. The timing signals may include a vertical synchronization signal, a horizontal synchronization signal, a data enable signal, a dot clock, etc. The timing controller 140 outputs the gate control signal GCS to the gate driver 110. The timing controller 140 outputs the 2D image data RGB2D or the multi-view image data MVD to the data driver 120. Also, the timing controller 140 outputs the data control signal DCS to the data driver 120.

In one embodiment, the optical plate 30 is disposed on the display panel 10. The optical plate 30 may pass through 2D images displayed in the display panel 10 in the 2D mode. In a 3D mode, the optical plate 30 controls display of the views of the multi-view images (e.g., such that a given view reaches a corresponding viewpoint in the 3D mode). For example, the optical plate 30 may control that a first view reaches a first viewpoint, that a second view reaches a second viewpoint, and so forth. Therefore, the user may watch each of the views on each of the viewpoints.

In one embodiment the optical plate 30 is implemented as a switchable lens which builds lenses in the 3D mode by controlling a liquid crystal or a switchable barrier which builds barriers in the 3D mode by controlling a liquid crystal. In the following description, example embodiments of a switchable barrier are described as an example of the optical plate 30. However, embodiments of this application are not limited thereto. For example, other kinds of the optical plate, such as the switchable lens, may be used. The switchable barrier 30 is described in detail below with reference to FIG. 2.

The optical plate driver 130 supplies driving voltages to electrodes of the optical plate 30 in order to control liquid crystal in the 2D mode and the 3D mode. In some embodiments, the optical plate driver 130 is implemented as a switchable barrier driver in examples where the optical plate 30 is implemented as a switchable barrier. However, embodiments of this application are not limited thereto. For example, other kinds of the optical plate driver, such as a switchable lens driver, may be used. The switchable barrier driver 130 is described in detail below with reference to FIG. 7. Hereinafter, the reference numbers 30 and 130 indicate the switchable barrier and the switchable barrier driver, respectively.

The multi-view image converter 150 receives the 2D image data RGB2D or 3D image data RGB3D. Also, the multi-view image converter 150 receives the mode signal MODE, and a view control signal Cview. The multi-view image converter 150 may distinguish the 2D mode from the 3D mode based on the value of the mode signal MODE. The multi-view image converter 150 outputs 2D image data RGB2D without conversion in the 2D mode. The multi-view image converter 150 may alternatively convert image data into multi-view image data MVD. For example, the multi-view image converter 150 may convert 2D image data RGB2D or 3D image data RGB3D into multi-view image data according to a number of the views specified by the view control signal Cview. The embodiment of multi-view image conversion performed by the multi-view image converter 150 is described in detail below with reference to FIG. 3.

The host system 160 supplies the 2D image data RGB2D or the 3D image data RGB3D to the multi-view image converter 150 through an interface such as a low voltage differential signaling (LVDS) interface or a transition minimized differential signaling (TMDS) interface. Furthermore, the host system 160 may supply the timing signals and the mode signal MODE, for distinguishing the 2D mode from the 3D mode, to the multi-view image converter 150.

In one embodiment, the host system 160 includes a view mode controller (not shown) which receives user detection data including the number of users detected from the user detector 170. The view mode controller calculates the number of optimum views according to the number of the users, and selects a view mode based on an optimum number of views. The view mode controller supplies the view control signal Cview which indicates the selected view mode to the switchable barrier driver 130 and the multi-view image converter 150. For example, the view mode controller may include a look-up table which receives the number of the users as an input address and outputs the optimum number of views stored in the input address.

The user detector 170 detects the number of the users. The user detector 170 may store images of the users watching the stereoscopic image display device by a camera. The user detector 170 may detect the number of the users by extracting a face of each user with a facial mask method. The user detector 170 may detect the face of each user with any of a variety of methods, which are well known in the art. The user detector 170 outputs the user detection data including the number of the users to the host system 160.

Figure 2:
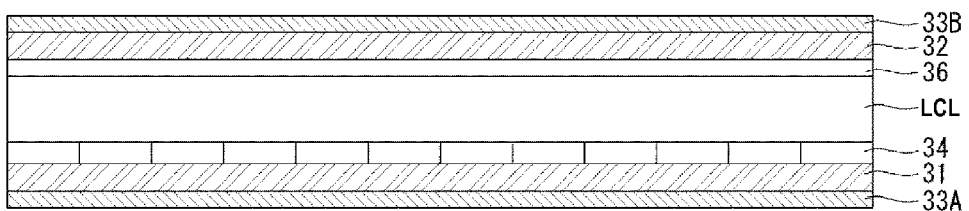
FIG. 2 illustrates a cross-sectional diagram of a switchable barrier shown in FIG. 1, according to one embodiment.

FIG. 2 illustrates a cross-sectional diagram of a switchable barrier 30 shown in FIG. 1, according to one embodiment. With reference to FIG. 2, the illustrated example switchable barrier 30 includes a first substrate 31, a second substrate 32, a first polarization film 33A, a second polarization film 33B, division electrodes 34, a liquid crystal layer LCL, and a barrier common electrode 36.

The first substrate 31 and the second substrate 32 may be implemented as a glass, a film, or a film on glass. The first polarization film 33A is disposed on the first substrate 31, and the second polarization film 33B is disposed on the second substrate 32. An optical axis of the first polarization film 33A may be rectangular with an optical axis of the second polarization film 33B.

The division electrodes 34 are formed on the first substrate 31. The barrier common electrode 36 is formed on the second substrate 32. The liquid crystal layer LCL is formed between the first substrate 31 and the second substrate 32 (e.g., between the division electrodes 34 and the common electrode 36). Liquid crystals of the liquid crystal layer LCL are responsive to voltage differences between the division electrodes 34 and the barrier common electrode 36.

The switchable barrier 30 may build barriers by controlling the liquid crystal electrically. More specifically, the switchable barrier 30 may build barriers by manipulating (e.g., moving) the liquid crystal of the liquid crystal layer LCL in accordance with voltage difference between the division electrode 34 and the barrier common electrode 36. Thus, the driving voltages supplied from the switchable barrier driver 130 to the division electrodes 34 in the 2D mode may differ from those in the 3D mode.

The switchable barrier 30 may manipulate the liquid crystal of the liquid crystal layer LCL to pass through the images displayed in the display panel 10. Thus, for example, the user may watch 2D images. In addition, the switchable barrier 30 may manipulate the liquid crystal to build barriers which block light. Accordingly, in the 3D mode, the switchable barrier 30 manipulates the liquid crystal to block a part of the multi-view images displayed in the display panel 10. Therefore, the switchable barrier 30 may be controlled to ensure that each view of the multi-view images reaches a corresponding viewpoint in the 3D mode. Therefore, the user may watch 3D images by binocular parallax.

The switchable barrier driver 130 supplies the driving voltages to the division electrodes 34, and a predetermined voltage to the barrier common electrode 36. The switchable barrier driver 130 may invert a polarity of the driving voltages periodically to prevent an image sticking. The image sticking may occur because the liquid crystals are piled up on the alignment layer of the first substrate 31 and the second substrate 32 when the switchable barrier driver 130 supplies the driving voltages as a direct current to the division electrodes 34. Also, the pre-tilt angles of liquid crystals may be changed when the switchable barrier driver 130 supplies the driving voltages as a direct current to the division electrodes 34.

The switchable barrier driver 130 may distinguish the 2D mode from the 3D mode based on the mode signal MODE from the host system 160. Also, the switchable barrier driver 130 controls the switchable barrier 30 to build barriers according to the number of the views of the selected view mode based on the view control signal Cview from the host system 160. The switchable barrier 30 and the switchable barrier driver 130 are described in detail below with reference to FIGS. 7, 8a, 8b, and 9.

Figure 3:
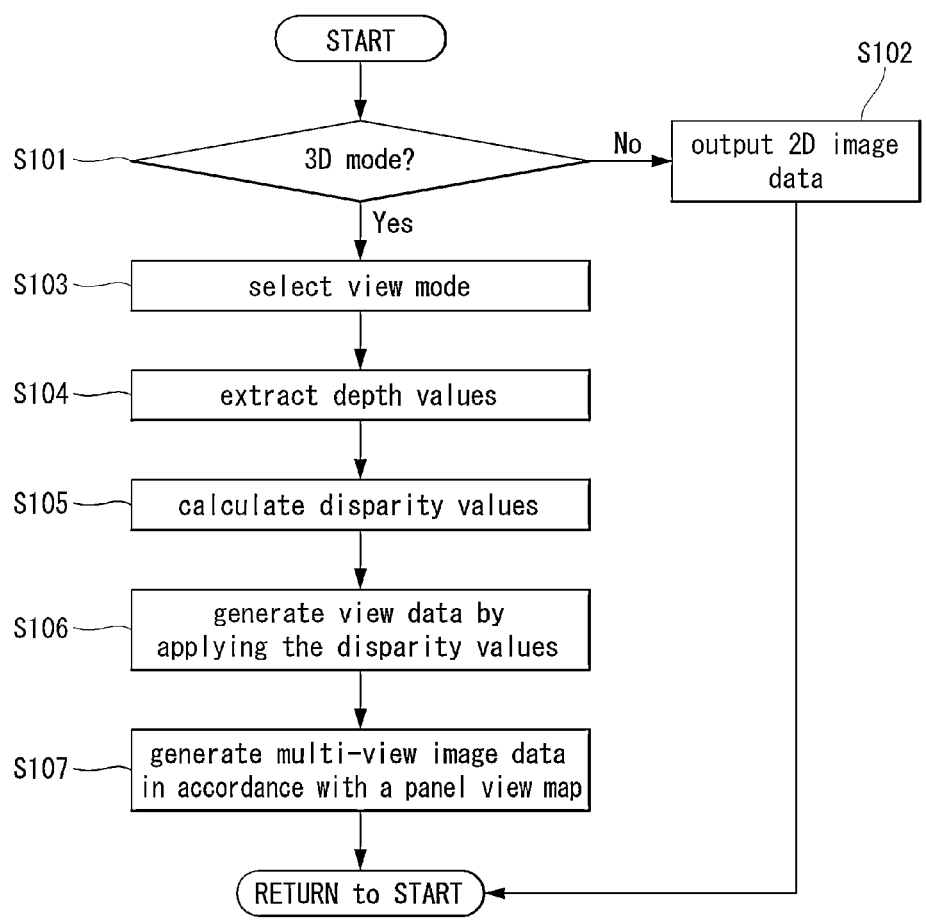
FIG. 3 illustrates a flow chart of an image conversion method of a multi-view image converter shown in FIG. 1, according to one embodiment.

FIG. 3 illustrates a flow chart of an image conversion method of a multi-view image converter 150 shown in FIG. 1, according to one embodiment. With reference to FIG. 3, the multi-view image converter 150 receives the 2D image data RGB2D or the 3D image data RGB3D from the host system 160. Also, the multi-view image converter 150 receives the mode signal MODE, and the view control signal Cview from the host system 160. The multi-view image converter 150 distinguishes the 2D mode from the 3D mode based on the mode signal MODE (S101). The multi-view image converter 150 determines the number of the views of the selected view mode based on the view control signal Cview.

In a 2D mode, the multi-view image converter 150 may output the 2D image data RGB2D without conversion to the timing controller 140 (S102).

In a 3D mode, the view mode controller of the host system 160 calculates the number of optimum views according to the number of the users, and selects one of the view modes based on the number of the optimum views (S103). The view mode controller supplies the view control signal Cview which indicates the selected view mode to the multi-view image converter 150. The multi-view image converter 150 determines the number of the views of the selected view mode according to the view control signal Cview in the 3D mode. For example, if the selected view mode is a first view mode which has two views, the multi-view image converter 150 may determine the number of the views as two. Also, if the selected view mode is a second view mode which has four views, the multi-view image converter 150 may determine the number of the views as four. In the following description, the first view mode having two views and the second view mode having four views are described as an example. However, embodiments of this application are not limited thereto. For example, the first view mode has j views and the second view has k views, wherein j and k are a natural number, and j is not equal to k.

The multi-view image converter 150 converts the 2D image data RGB2D or the 3D image data RGB3D into the multi-view image data MVD which has two views in the first view mode. The 3D image data RGB3D includes left-eye image data and right-eye image data. The multi-view image converter 150 converts the 2D image data RGB2D or the 3D image data RGB3D into the multi-view image data MVD which has four views in the second view mode.

The multi-view image converter 150 calculates disparity values by using depth values when receiving the 2D image data RGB2D from the host system 160 (S105). The multi-view image converter 150 finds an object through object detection techniques and extracts depth values of the object by using various depth cues (S104). The depth cues mean various kinds of methods capable of obtaining the depth values of the object. The depth cues include a reiteration analysis, a vanishing point analysis, a shadow analysis, a motion analysis, an outline analysis, relative size analysis, and so on. The reiteration analysis analyzes objects piled up and determines a depth value of a front object and a depth value of a rear object, respectively. The vanishing point analysis detects a vanishing point of an object and processes the vanishing point as a background depth value to create perspective. The shadow analysis determines a depth value according to darkness and brightness of an object. The motion analysis detects a motion of an object and determines a depth value of the object according to the relativity of the motion. The outline analysis determines a depth value of an object according to the outline of the object. The relative size analysis determines a depth value by comparing the size of each of the objects with each other.

Figure 4A:
FIG. 4A illustrates an example screen shot of an original image.
Figure 4B:
FIG. 4B illustrates an example screen shot of a depth map image.

FIG. 4A illustrates an example screen shot of an original image. FIG. 4B illustrates an example screen shot of a depth map image. Referring to FIGS. 4A and 4B, the depth value can be represented as the gray level. The original image may be a 2D image obtained from the 2D image data RGB2D. The depth map image is an image obtained from the depth values. When the 2D image data or the 3D image data of 8 bits is input, the depth value is represented as the gray level '0' to '255'. The gray level '0' means a peak black and the gray level '255' means a peak white. As the depth value has a higher gray level, the 3D effect of the multi-view images is deeper. Also, as the depth value has a lower gray level, the 3D effect of the multi-view images is shallower.

The multi-view image converter 150 may calculate the disparity values by using a convergence, a max disparity, and the depth values (S105). A disparity value means a value for shifting 2D image data. The 3D effect of the 3D images is controlled by the disparity. The convergence means a position on which a focus of the 3D images is formed. The focus of the 3D images may be formed at the front of the display panel 10 or the rear of the display panel 10 by controlling the convergence. The max disparity means a maximum value for shifting 2D image data RGB2D and may be pre-determined through an experiment. As the depth value has a higher gray level, the disparity value has lower. Also, as the depth value has a lower gray level, the disparity value has higher.

Figure 4C:
FIG. 4C illustrates example screen shots of view images.

The multi-view image converter 150 generates view data by applying the disparity values to the 2D image data RGB2D (S106). FIG. 4C illustrates example screen shots of view images. The view images are images obtained from the view image data. For example, the first view image is an image obtained from the first view image data, and the second view image is an image obtained from the second view image data. Also, the third view image is an image obtained from the third view image data, and the fourth view image is an image obtained from the fourth view image data. With reference to FIG. 4C, the multi-view image converter 150 generates four view data for shifting the 2D image data RGB2D by the disparity values.

In some instances, an occlusion area and a hole area occurs due to shifting the 2D image data RGB2D by the disparity values. The occlusion area indicates an area in which the 2D image data RGB2D is deleted or does not exist, and the hole area indicates an area in which the 2D image data RGB2D is lost. The occlusion area and the hole area may be corrected to achieve higher quality of 3D images. Therefore, the multi-view image converter 150 may correct the occlusion area and the hole area with in-painting or another method well known in the art.

Figure 4D:
FIG. 4D illustrates an example screen shot of a multi-view image.

Lastly, the multi-view image converter 150 generates the multi-view image data MVD by arranging view data in accordance with a panel view map (S107). For example, the multi-view image converter 150 generates the multi-view image data MVD by arranging 2 view data in the first view mode which has 2 views in accordance with a panel view map. Similarly, the multi-view image converter 150 generates the multi-view image data MVD by arranging 4 view data in the second view mode which has 4 views in accordance with a panel view map. FIG. 4D illustrates an example screen shot of a multi-view image. The multi-view image is an image obtained from the multi-view image data MVD. The multi-view image converter 150 outputs the multi-view image data MVD to the timing controller 140.

Figure 5:
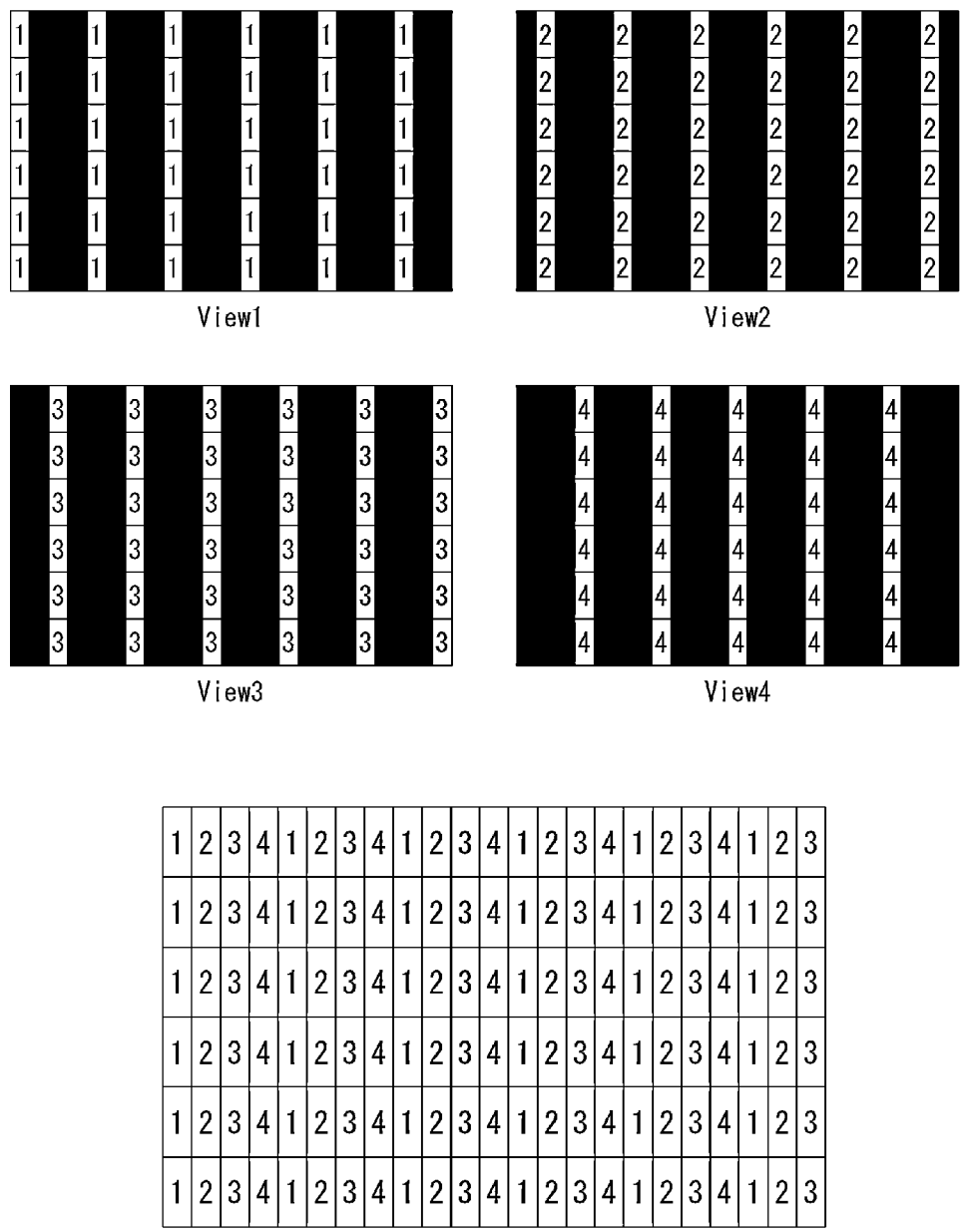
FIG. 5 illustrates an example of a vertical view map and view images in a second view mode.
Figure 6:
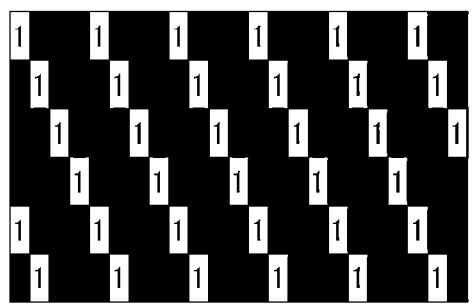
FIG. 6 illustrates an example of a slanted view map and view images in a second view mode.
Figure 6:
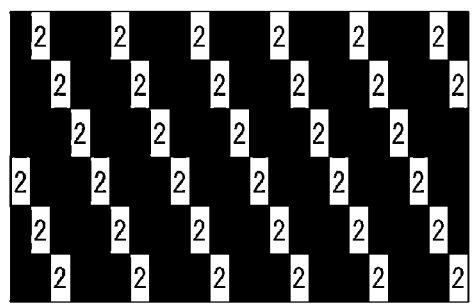
Figure 6:
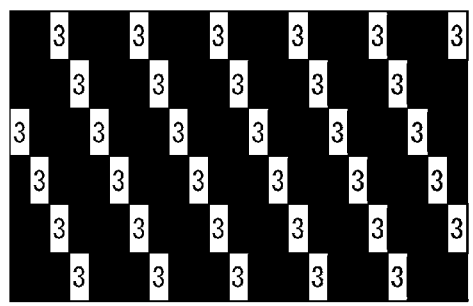
Figure 6:
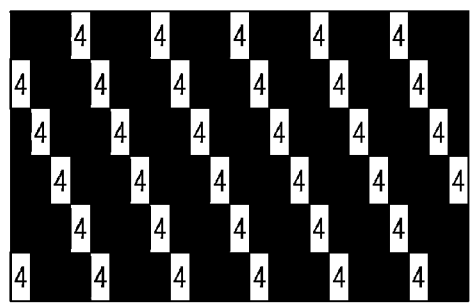

FIG. 5 illustrates an example of a vertical view map and view images in a second view mode. FIG. 6 illustrates an example of a slanted view map and view images in a second view mode.

With reference to FIG. 5, each of first to fourth view data is arranged vertically on the vertical view map. The switchable barrier 30 should build the barriers in a vertical direction, so the user may watch the first view View1, the second view View2, the third view View3, and the fourth view View4 according to the user's position. The barriers are conceptually represented in black in FIG. 5 because the barriers block light.

With reference to FIG. 6, each of the first to fourth view data is arranged obliquely on the slanted view map. The switchable barrier should build the barriers in a slanted direction, so the user may watch the first view View1, the second view View2, the third view View3, and the fourth view View4 according to the user's position. The barriers are conceptually represented in black in FIG. 6 because the barriers block light.

Figure 7:
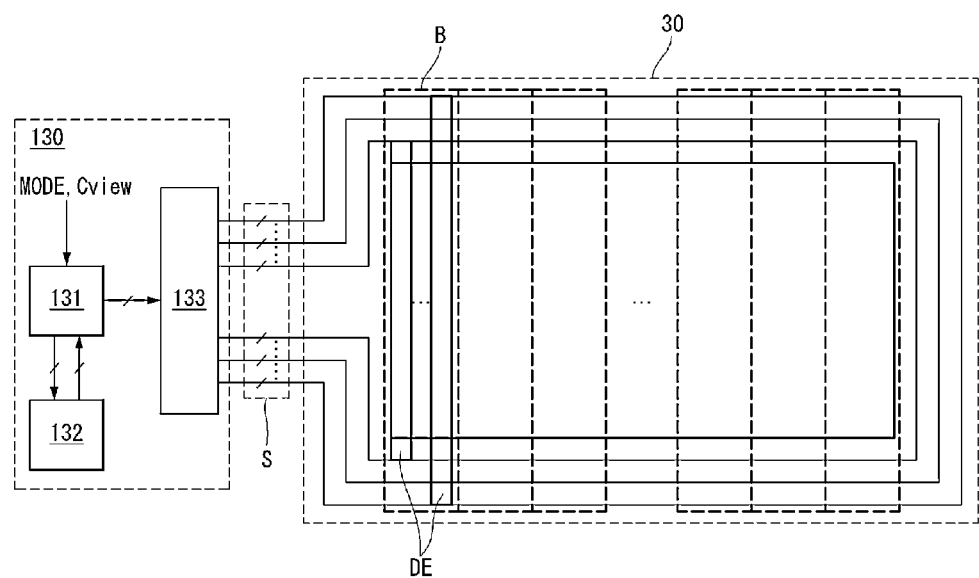
FIG. 7 illustrates a block diagram of a switchable barrier and a switchable barrier driver according to one embodiment.

FIG. 7 illustrates a block diagram of a switchable barrier and a switchable barrier driver according to one embodiment. With reference to FIG. 7, the switchable barrier 30 includes a plurality of driving voltage supply lines S and barriers B. The barriers B include a plurality of the division electrodes DE. The switchable barrier 30 may build barriers by controlling the liquid crystal electrically. More specifically, the switchable barrier 30 may build barriers because the liquid crystals of the liquid crystal layer LCL moves in accordance with voltage difference between the division electrode 34 and the barrier common electrode 36. Thus, the driving voltages supplied from the switchable barrier driver 130 to the division electrodes 34 in the first view mode may be different from in the second view mode. The driving voltages supplied from the switchable barrier driver 130 are described in detail below with reference to FIGS. 8A and 8B.

In the illustrated embodiment, the switchable barrier driver 130 includes a switchable barrier controller 131, a look-up table 132, and a switchable barrier voltage supplier 133. The switchable barrier controller 131 receives the mode signal MODE and the view control signal Cview from the host system 160. The switchable barrier controller 131 distinguishes the 2D mode from the 3D mode based on the mode signal MODE. Also, the switchable barrier controller 131 distinguishes the selected view mode, the first view mode or the second view mode, based on the view control signal Cview. The look-up table 132 stores data such as 2D driving voltage data, first view driving voltage data, second view driving voltage data, and other data used by the barrier driver 130.

In the 2D mode, the switchable barrier controller 131 receives the 2D driving voltage data from the look-up table 132, and outputs the 2D driving voltage data to the switchable barrier driving supplier 133. The switchable barrier driving supplier 133 converts the 2D driving voltage data into analog 2D driving voltages, and supplies the analog 2D driving voltages to the driving voltage supply lines S of the switchable barrier 30. The liquid crystal layer of the switchable barrier 30 does not build the barriers if the analog 2D driving voltages are supplied.

In the first view mode of the 3D mode, the switchable barrier controller 131 receives the first view driving voltage data from the look-up table 132, and outputs the first view driving voltage data to the switchable barrier driving supplier 133. The switchable barrier driving supplier 133 converts the first view driving voltage data into analog first view driving voltages, and supplies the analog first view driving voltages to the driving voltage supply lines S of the switchable barrier 30. The liquid crystal layer of the switchable barrier 30 builds the barriers in order to implement the multi-view images (e.g., with two views if the analog first view driving voltages are supplied).

In the second view mode of the 3D mode, the switchable barrier controller 131 receives the second view driving voltage data from the look-up table 132, and outputs the second view driving voltage data to the switchable barrier driving supplier 133. The switchable barrier driving supplier 133 converts the second view driving voltage data into analog second view driving voltages, and supplies the analog second view driving voltages to the driving voltage supply lines S of the switchable barrier 30. The liquid crystal layer of the switchable barrier 30 builds the barriers in order to implement the multi-view images (e.g., with four views if the analog second view driving voltages are supplied).

Figure 8A:
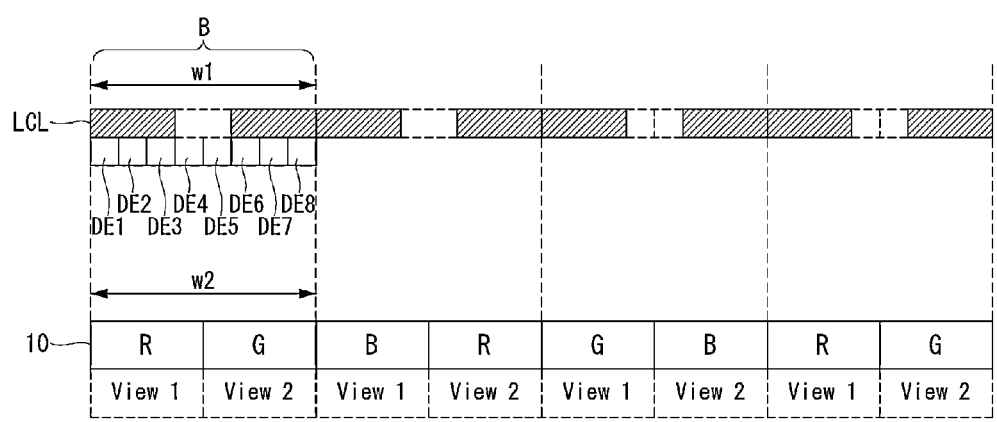
FIG. 8A illustrates example view images displayed in a display panel and barriers of a switchable barrier in a first example view mode, according to one embodiment.
Figure 8B:
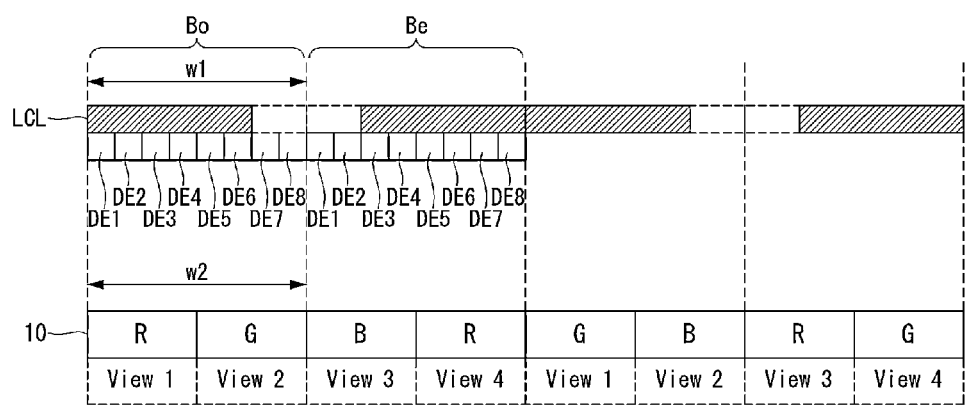
FIG. 8B illustrates example view images displayed in a display panel and barriers of a switchable barrier in a second example view mode, according to one embodiment.

FIG. 8A illustrates view images displayed in a display panel 10 and barriers B of a switchable barrier 30 in a first example view mode, according to one embodiment. FIG. 8B illustrates view images displayed in a display panel 10 and barriers B of a switchable barrier 30 in a second example view mode. In FIG. 8A, sub-pixels of the display panel 10 display two views in the first view mode. In FIG. 8B, the sub-pixels of the display panel 10 display four views in the second view mode.

Each of the barriers B of the switchable barrier 30 is opposite to even number of the sub-pixels. That is, a first width W1 of each of the barriers B is equal to a second width W2 of the even number of the sub-pixels. For example, the even number of the sub-pixels may be two sub-pixels as shown in FIGS. 8A and 8B.

Each of the barriers B of the switchable barrier 30 includes a plurality of the division electrodes. The number of the division electrodes is p, wherein p is a natural number greater than 1, so that the switchable barrier 30 builds the barriers B in the first view mode different from in the second view mode.

$$p = \frac{[K]}{A}, [K] = \left[\frac{N_{L\text{-}view}}{N_{S\text{-}view}}\right] \qquad \text{[equation 1]}$$

In equation 1, $N_{L\text{-}view}$ indicates a bigger one among the number of the views of the first view mode and the number of the views of the second view mode, and $N_{S\text{-}view}$ indicates a smaller one among the number of the views of the first view mode and the number of the views of the second view mode, and [K] indicates a minimum integer which K has in case of multiplying K by q which is a natural number. Also, A indicates an aperture ratio, and p indicates the number of the division electrodes included in each of the barriers B. For example, if the first view mode has two views and the second view mode has four views, $N_{L\text{-}view}$ is 4, and $N_{S\text{-}view}$ is 2, and K is 2, and [K] is 2. Therefore, if A is 25%, p is 8. Accordingly, the number of the division electrodes DE1~DE8 are 8 in FIGS. 8A and 8B.

With reference to FIG. 8A, the switchable barrier 30 builds the barriers for implementing two views because the sub-pixels of the display panel 10 display the multi-view images having two views. The first to third and the sixth to eighth division electrodes DE1~DE3, DE6~DE8 are supplied to a first driving voltage so that barriers are built in the liquid crystal layer LCL of the switchable barrier 30. That is, the liquid crystals of the liquid crystal layer LCL moves in accordance with voltage difference between the first driving voltage of the first to the third division electrodes DE1~DE3 and the barrier common voltage of the barrier common electrode 36. The liquid crystals of the liquid crystal layer LCL moves in accordance with voltage difference between the first driving voltage of the sixth to the eighth division electrodes DE6~DE8 and the barrier common voltage of the barrier common electrode 36. Thereby, the liquid crystals of the liquid crystal layer LCL between the first to the third division electrodes DE1~DE3 and the barrier common electrode 36 function as the barriers B. The liquid crystal layer LCL between the sixth to the eighth division electrodes DE6~DE8 and the barrier common electrode 36 functions as the barriers B. Also, the fourth and the fifth division electrodes are supplied to a second driving voltage so that the barriers are not built the liquid crystal layer LCL. That is, the liquid crystals of the liquid crystal layer LCL moves in accordance with voltage difference between the second driving voltage of the fourth and the fifth division electrodes DE4, DE5 and the barrier common voltage of the barrier common electrode 36. Thereby, the liquid crystals of the liquid crystal layer LCL between the fourth and the fifth division electrodes DE4, DE5 and the barrier common electrode 36 do not function as the barriers B.

With reference to FIG. 8B, the switchable barrier 30 builds the barriers for implementing four views because the sub-pixels of the display panel 10 display the multi-view images having four views. In an odd barrier Bo, the first to the sixth division electrodes DE1~DE6 are supplied to a first driving voltage so that barriers are built in the liquid crystal layer LCL of the switchable barrier 30. That is, the liquid crystals of the liquid crystal layer LCL moves in accordance with voltage difference between the first driving voltage of the first to sixth division electrodes DE1~DE6 and the barrier common voltage of the barrier common electrode 36. Thereby, the liquid crystals of the liquid crystal layer LCL between the first to the sixth division electrodes DE1~DE6 and the barrier common electrode 36 function as the barriers B. Also, in the odd barrier Bo, the seventh and the eighth division electrodes DE7, DE8 are supplied to a second driving voltage so that the barriers are not built the liquid crystal layer LCL. That is, the liquid crystals of the liquid crystal layer LCL moves in accordance with voltage difference between the second driving voltage of the seventh and the eighth division electrodes DE7, DE8 and the barrier common voltage of the barrier common electrode 36. Thereby, the liquid crystals of the liquid crystal layer LCL between the seventh and the eighth division electrodes DE7, DE8 and the barrier common electrode 36 do not function as the barriers B.

In an even barrier Be, the third to the eighth division electrodes DE3~DE8 are supplied to a first driving voltage so that barriers are built in the liquid crystal layer LCL of the switchable barrier 30. That is, the liquid crystals of the liquid crystal layer LCL moves in accordance with voltage difference between the first driving voltage of the third to the eighth division electrodes DE3~DE8 and the barrier common voltage of the barrier common electrode 36. Thereby, the liquid crystals of the liquid crystal layer LCL between the third to the eighth division electrodes DE3~DE8 and the barrier common electrode 36 function as the barriers B. Also, in the even barrier Be, the first and the second division electrodes DE1, DE2 are supplied to a second driving voltage so that the barriers are not built the liquid crystal layer LCL. That is, the liquid crystals of the liquid crystal layer LCL moves in accordance with voltage difference between the second driving voltage of the first and the second division electrodes DE1, DE2 and the barrier common voltage of the barrier common electrode 36. Thereby, the liquid crystals of the liquid crystal layer LCL between the first and the second division electrodes DE1, DE2 and the barrier common electrode 36 do not function as the barriers B.

Images with additional views may be implemented in a similar manner through the selective building of barriers to establish a view at each of the plurality of viewpoints according to the Cview and MODE signals.

FIG. 9 illustrates an example of 2D driving voltage data, first view driving voltage data, and second view driving voltage data stored in a look-up table shown in FIG. 7, according to one embodiment. With reference to FIG. 9, a value '0' indicates a driving voltage data when the liquid crystals of the liquid crystal layer do not function as the barriers B. A value '1' indicates a driving voltage data when the liquid crystals of the liquid crystal layer function as the barriers B. An input address of the 2D driving voltage data, the input address of the first view driving voltage data, and the input address of the second view driving voltage data are different with each other. For example, as shown in FIG. 9, the input address of the 2D driving voltage data is 'H1', and the input address of the first view driving voltage data is 'H2', and the input address of the second view driving voltage data is 'H3'.

Each of the 2D driving voltage data, the first view driving voltage data, and the second view driving voltage data are defined as an equation 2. Each of the 2D driving voltage data, the first view driving voltage data, and the second view driving voltage data may be represented as bits.

$$C \geq p \cdot [K], \quad [K] = \left\lceil \frac{N_{L\text{-}view}}{N_{S\text{-}view}} \right\rceil \qquad \text{[Equation 2]}$$

In equation 2, C indicates the 2D driving voltage data, the first view driving voltage data, or the second view driving voltage data, and p indicates the number of the division electrodes included in each barrier. Also, $N_{L\text{-}view}$ indicates a bigger one among the number of the views of the first view mode and the number of the views of the second view mode, and $N_{S\text{-}view}$ indicates a smaller one among the number of the views of the first view mode and the number of the views of the second view mode, and [K] indicates a minimum integer which K has in case of multiplying K by q. For example, if the first view mode has two views and the second view mode has four views, $N_{L\text{-}view}$ is 4, and $N_{S\text{-}view}$ is 2, and K is 2, and [K] is 2. Therefore, if p is 8 as calculated in equation 1, C is 16. Accordingly, each of the 2D driving voltage data, the first view driving voltage data, and the second view driving voltage data may be implemented as 16 bits.

Figure 10:
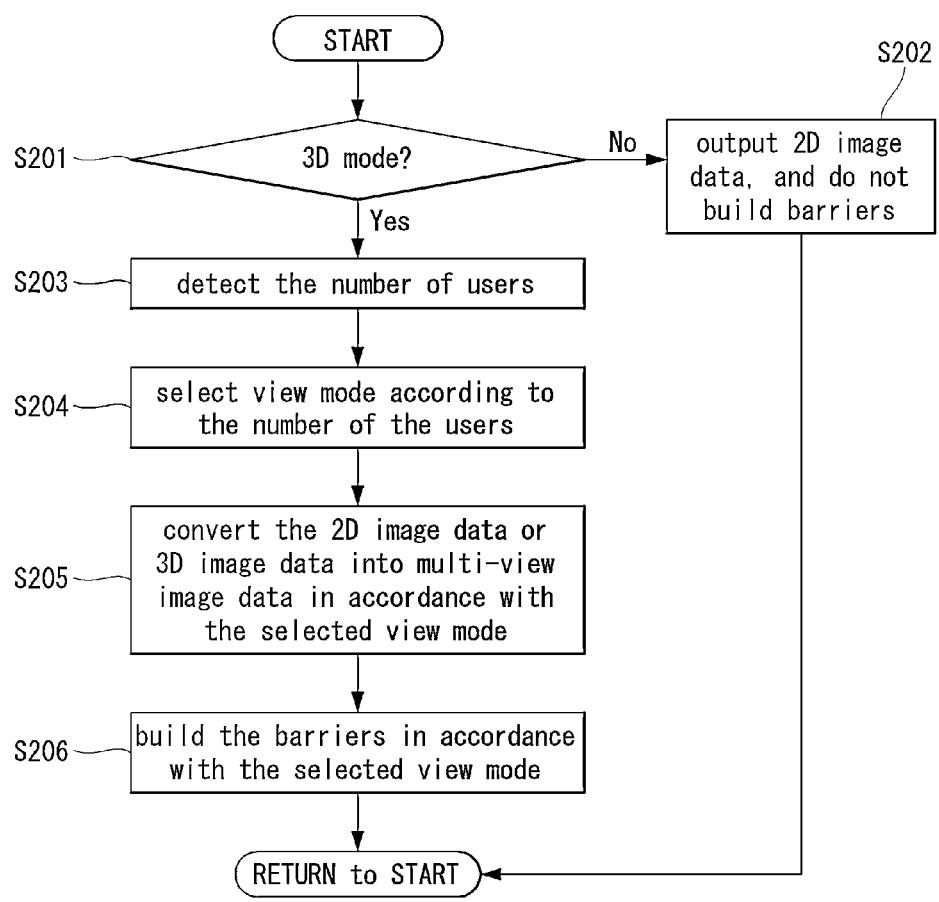
FIG. 10 illustrates a flow chart of a method for driving the stereoscopic image display device according to one embodiment.

FIG. 10 illustrates a flow chart of a method for driving the stereoscopic image display device according to one embodiment. First, the host system 160 generates the mode signal MODE which indicates the 2D mode or the 3D mode and it is determined whether the mode signal MODE is in 3D mode (S201). In the 2D mode, the multi-view image converter 150 outputs the 2D image data without conversion (S202). Also, in the 2D mode, the switchable barrier driver 130 supplies the second driving voltage to the division electrodes 34 and the barrier common voltage to the barrier common electrode 36. Therefore, the sub-pixels of the display panel 10 display the 2D images, and the switchable barrier 30 does not build the barriers.

In the 3D mode, the user detector 170 may store images of the users watching the stereoscopic image display device by a camera. The user detector 170 may detect the number of the users by extracting a face of each user with a facial mask method (S203). The user detector 170 may detect the face of each user with any methods which is known for a public. The user detector 170 outputs the user detection data including the number of the users to the host system 160.

The view mode controller of the host system 160 receives user detection data including the number of users detected from the user detector 170. The view mode controller calculates the optimum number of views according to the number of the users, and selects one of view modes based on the number of the optimum views (S204). The view mode controller supplies the view control signal Cview which indicates the selected view mode to the switchable barrier driver 130 and the multi-view image converter 150.

The multi-view image converter 150 converts the 2D image data RGB2D or the 3D image data RGB3D into multi-view image data according to the number of the views based on the view control signal Cview (S205). Multi-view image conversion method of the multi-view image converter 150 is described in detail with reference to FIG. 3.

The switchable barrier driver 130 supplies the driving voltages to division electrodes of the switchable barrier 30 to control S206 liquid crystals of the liquid crystal layer in the selected view mode of the 3D mode. Based on the received driving voltages, the division electrodes block (e.g., by forming a barrier) or pass through light to establish the multiple views. The switchable barrier driver 130 is described in detail with reference to FIGS. 7, 8A, 8B, and 9.

The embodiments described herein may calculate the number of the optimum views by detecting the number of the users, and select one of the view modes based on the number of the optimum views. Also, the embodiments described herein may convert the 2D image data or the 3D image data into the multi-view image data according to the selected view mode in the 3D mode, and control the switchable barrier to build barriers according to the selected view mode in the 3D mode. Thus, the embodiments described herein may control the number of the views of the multi-view images depending on the number of the users. Accordingly, the embodiments described herein may implement optimally both the resolution of the display panel and the quality of the 3D images.

Although the embodiments of this application have been described with reference to a number of illustrative embodiments thereof, it should be understood that numerous other modifications and embodiments of this application can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
a display panel configured to display an image;
an optical plate configured to pass through the displayed image in a 2D mode and separate the displayed image in a 3D mode;
a user detector configured to detect a number of users, and output detection data including the number of the users;
a view mode controller configured to calculate an optimum number of views according to the number of the users for displaying the image in the 3D mode, and select a view mode from at least two view modes including a first view mode and a second view mode based on the optimum number of views, the first view mode and the second view mode having different number of views; and
a multi-view images converter configured to convert image data in the 3D mode into multi-view image data according to the number of views in the selected view mode, the optical plate separating a displayed multi-view image based on the number of views in the selected view mode,
wherein the optical plate includes a switchable barrier to form a plurality of barriers according to the selected view mode, first barriers being formed in the first view mode and second barriers being formed in the second view mode, the first barriers and the second barriers being different in size and location within the optical plate from each other.

2. The stereoscopic image display device of claim 1, wherein the multi-view image converter is further configured to calculate disparity values based on depth values of a depth map extracted from 2D image data, generate the multi-view image data based on the number of the views in the selected view mode by applying the disparity values in the 3D mode, and output the multi-view image data according to a panel view map, wherein the multi-view image data includes first to n-th view image data, wherein n is a natural number.

3. The stereoscopic image display device of claim 2, wherein the panel view map is implemented as a vertical view map which arranges each of the first to n-th view image data vertically in a row, or a slanted view map which arranges each of the first to n-th view image data obliquely.

4. The stereoscopic image display device of claim 1, wherein the switchable barrier builds the barriers in the 3D mode by controlling a liquid crystal of a liquid crystal layer.

5. The stereoscopic image display device of claim 4 further comprising:
a switchable barrier driver configured to supply driving voltages to electrodes of the switchable barrier.

6. The stereoscopic image display device of claim 5, wherein the switchable barrier driver comprises:
a switchable barrier controller configured to output 2D driving voltage data from a look-up table in the 2D mode, and output view mode driving voltage data corresponding to the selected view mode from the look-up table in the 3D mode; and
a switchable barrier voltage supplier configured to supply voltages to the electrodes of the switchable barrier by converting the 2D driving voltage data in the 2D mode, and by converting the view mode driving voltage corresponding to the selected view mode in the 3D mode.

7. The stereoscopic image display device of claim 6, wherein each of the barriers corresponds with two sub-pixels of the display panel.

8. The stereoscopic image display device of claim 7, wherein each of the barriers includes a plurality of division electrodes, wherein a number of the division electrodes is p which is a natural number greater than 2, wherein p is satisfied with $$p = \frac{[K]}{A}, [K] = \left\lceil \frac{N_{L\text{-}view}}{N_{S\text{-}view}} \right\rceil,$$

wherein $N_{L\text{-}view}$ indicates a bigger one among a number of views of the first view mode and a number of views of the second view mode, $N_{S\text{-}view}$ indicates a smaller one among the number of the views of the first view mode and the number of the views of the second view mode, [K] indicates a minimum integer which K has in case of multiplying K by q which is a natural number, and A indicates aperture ratio.

9. The stereoscopic image display device of claim 7, wherein each of the 2D driving voltage data and the view mode driving voltage of the selected view mode is represented as C bits, wherein C is satisfied with $$C \geq p \cdot [K], [K] = \left\lceil \frac{N_{L\text{-}view}}{N_{S\text{-}view}} \right\rceil,$$

wherein p indicates a number of division electrodes included in each of the barriers, $N_{L\text{-}view}$ indicates a bigger one among a number of views of the first view mode and a number of views of the second view mode, $N_{S\text{-}view}$ indicates a smaller one among the number of the views of the first view mode and the number of the views of the second view mode, and [K] indicates a minimum integer which K has in case of multiplying K by q which is a natural number.

10. A method of driving a stereoscopic image display device including a display panel and an optical plate configurable in a 2D mode and a 3D mode, the method comprising:

detecting a number of users, and outputting detection data including the number of the users;

calculating an optimum number of views according to the number of the users for displaying an image in the 3D mode, and selecting a view mode from at least two view modes including a first view mode and a second view mode for configuring the optical plate in the 3D mode based on a number of views in the selected view mode, the first view mode and the second view mode having different number of views;

outputting image data in the 2D mode without conversion, and converting the image data into multi-view image data according to the number of the views in the selected view mode for configuring the optical plate in the 3D mode; and configuring a switchable barrier included in the optical plate to form a plurality of barriers according to the selected view mode, first barriers being formed in the first view mode and second barriers being formed in the second view mode, the first barriers and the second barriers being different in size and location within the optical plate from each other.

11. The method of claim 10, wherein converting the image data into the multi-view image data comprises:

calculating disparity values based on depth values of a depth map extracted from 2D image data, generating the multi-view image data based on the number of the views in the selected view mode by applying the disparity values in the 3D mode, and outputting the multi-view image data according to a panel view map, wherein the multi-view image data includes first to n-th view image data, wherein n is a natural number.

12. The method of claim 11, wherein the panel view map is implemented as a vertical view map which arranges each of the first to n-th view image data vertically in a row, or a slanted view map which arranges each of the first to n-th view image data obliquely.

13. The method of claim 10, wherein the switchable barrier builds the barriers in the 3D mode by controlling a liquid crystal of a liquid crystal layer.

14. The method of claim 13 further comprising:

supplying driving voltages to electrodes of the switchable barrier.

15. The method of claim 14, wherein the supplying driving voltages to electrodes of the switchable barrier comprises:

outputting 2D driving voltage data from a look-up table in the 2D mode, and outputting view mode driving voltage data corresponding to the selected view mode from the look-up table in the 3D mode; and supplying analog voltages to the electrodes of the switchable barrier by converting the 2D driving voltage data in the 2D mode, and by converting the view mode driving voltage corresponding to the selected view mode in the 3D mode.

16. The method of claim 15, wherein each of the barriers corresponds with two sub-pixels of the display panel.

17. The method of claim 16, wherein each of the barriers includes a plurality of division electrodes, wherein a number of the division electrodes is p which is a natural number greater than 2, wherein p is satisfied with $$p = \frac{[K]}{A}, [K] = \left\lceil \frac{N_{L\text{-}view}}{N_{S\text{-}view}} \right\rceil,$$

wherein $N_{L\text{-}view}$ indicates a bigger one among a number of views of the first view mode and a number of views of the second view mode, $N_{S\text{-}view}$ indicates a smaller one among the number of the views of the first view mode and the number of the views of the second view mode, and [K] indicates a minimum integer which K has in case of multiplying K by q which is a natural number, and A indicates aperture ratio.

18. The method of claim 16, wherein each of the 2D driving voltage data and the view mode driving voltage of the selected view mode is represented as C bits, wherein C is satisfied with $$C \geq p \cdot [K], [K] = \left\lceil \frac{N_{L\text{-}view}}{N_{S\text{-}view}} \right\rceil,$$

wherein p indicates a number of division electrodes included in each of the barriers, $N_{L\text{-}view}$ indicates a bigger one among a number of views of the first view mode and a number of views of the second view mode, $N_{S\text{-}view}$ indicates a smaller one among the number of the views of the first view mode and the number of the views of the second view mode, and [K] indicates a minimum integer which K has in case of multiplying K by q which is a natural number.

* * * * *